US007904126B2

(12) United States Patent
Kim et al.

(10) Patent No.: US 7,904,126 B2
(45) Date of Patent: Mar. 8, 2011

(54) ANTENNA APPLIED TO SLIDE TYPE MOBILE COMMUNICATION TERMINAL

(75) Inventors: Yong-jin Kim, Seoul (KR); Do-hoon Kwon, Seoul (KR); Young-eil Kim, Suwon-si (KR); Ji-hun Koo, Yongin-si (KR); Ick-jae Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1155 days.

(21) Appl. No.: 11/486,280

(22) Filed: Jul. 14, 2006

(65) Prior Publication Data

US 2007/0126644 A1 Jun. 7, 2007

(30) Foreign Application Priority Data

Dec. 5, 2005 (KR) ........................ 10-2005-0117554

(51) Int. Cl.
*H04M 1/00* (2006.01)
*H01Q 1/24* (2006.01)

(52) U.S. Cl. ...................................... 455/575.4; 343/702

(58) Field of Classification Search ............... 455/575.4, 455/575.5, 41.1, 575.3, 575.1, 550.1; 343/702, 343/700, 729, 795, 725, 102, 821, 793, 797, 343/799, 830
See application file for complete search history.

(56) References Cited

U.S. PATENT DOCUMENTS 5,966,099 A 10/1999 Xue
6,097,342 A * 8/2000 Engblom ...................... 343/702
6,209,173 B1 * 4/2001 Salter et al. ...................... 16/342
6,246,374 B1 6/2001 Perrotta et al.
6,256,481 B1 * 7/2001 Jeong et al. ................ 455/575.3
6,539,208 B1 * 3/2003 Mori .......................... 455/575.3
6,751,488 B2 * 6/2004 Lee ............................ 455/575.3
6,981,296 B2 * 1/2006 Lee et al. ........................ 16/330
7,102,881 B2 * 9/2006 Park et al. ................ 361/679.08
7,225,000 B2 * 5/2007 Katayanagi ................... 455/567
7,239,289 B2 * 7/2007 Kim .............................. 343/860
7,286,089 B2 * 10/2007 Lee et al. ...................... 343/702
7,539,512 B2 * 5/2009 Iida ............................ 455/550.1
7,580,734 B2 * 8/2009 Ahn et al. .................. 455/575.1
7,786,975 B2 * 8/2010 Ording et al. ................. 345/156
2001/0016474 A1 * 8/2001 Nagashima ..................... 455/90
2001/0044320 A1 * 11/2001 Ono et al. ..................... 455/550
2002/0080074 A1 * 6/2002 Wang ..................... 343/700 MS
2002/0137476 A1 * 9/2002 Shin ................................ 455/90
2002/0187818 A1 * 12/2002 Kang ............................ 455/575
2003/0008677 A1 * 1/2003 Kim et al. ..................... 455/550
2003/0064688 A1 * 4/2003 Mizuta et al. ................... 455/90
2003/0087609 A1 * 5/2003 Cheng ............................. 455/90
2003/0114198 A1 * 6/2003 Han ............................... 455/566
(Continued)

FOREIGN PATENT DOCUMENTS

DE 20120405 U 4/2002
(Continued)

*Primary Examiner* — Melody Mehrpour
(74) *Attorney, Agent, or Firm* — Sughrue Mion, PLLC

(57) ABSTRACT

An antenna applied to a slide type mobile communication terminal includes a first board mounted in a first body; a second board mounted in a second body; a radiating element mounted to the second body; and a first contact formed to connect to the second board at one end and contact with the first board at the other end when the first body slides. Accordingly, an antenna with directionality can be realized for applications to short range communication systems.

10 Claims, 6 Drawing Sheets

U.S. PATENT DOCUMENTS

| | | | | |
|---|---|---|---|---|
| 2003/0203747 | A1 * | 10/2003 | Nagamine | 455/575.3 |
| 2004/0125029 | A1 | 7/2004 | Maoz et al. | |
| 2004/0132482 | A1 * | 7/2004 | Kang et al. | 455/550.1 |
| 2004/0185921 | A1 * | 9/2004 | Tornaghi | 455/575.1 |
| 2004/0203522 | A1 * | 10/2004 | Lim | 455/90.3 |
| 2004/0203529 | A1 | 10/2004 | Hong et al. | |
| 2004/0209641 | A1 * | 10/2004 | Hong | 455/550.1 |
| 2004/0229662 | A1 * | 11/2004 | Chadha | 455/575.1 |
| 2005/0009571 | A1 * | 1/2005 | Chiam et al. | 455/566 |
| 2005/0051148 | A1 * | 3/2005 | Sung et al. | 126/9 R |
| 2005/0079902 | A1 * | 4/2005 | Chen et al. | 455/575.4 |
| 2005/0137001 | A1 * | 6/2005 | Bell et al. | 455/575.4 |
| 2006/0097933 | A1 * | 5/2006 | Lee | 343/702 |

FOREIGN PATENT DOCUMENTS

| | | | |
|---|---|---|---|
| EP | 1292042 | A2 | 3/2003 |
| JP | 9-64625 | A | 3/1997 |
| JP | 2003-273767 | A | 9/2003 |
| WO | WO 98/09414 | A1 | 3/1998 |
| WO | 03067702 | A2 | 8/2003 |

* cited by examiner

ANTENNA APPLIED TO SLIDE TYPE MOBILE COMMUNICATION TERMINAL

CROSS-REFERENCE TO RELATED APPLICATIONS

This application claims priority under 35 U.S.C. §119 (a) from Korean Patent Application No. 2005-117554, filed Dec. 5, 2005, in the Korean Intellectual Property Office, the entire disclosure of which is incorporated herein by reference.

BACKGROUND OF THE INVENTION

1. Field of the Invention

Apparatuses consistent with the present invention generally relate to an antenna applied to a slide type mobile communication terminal. More particularly, the present invention relates to an antenna applied to a slide type mobile communication terminal for implementing directionality while a type of the antenna is retained.

2. Description of the Related Art

An antenna operates to convert an electrical signal and an electromagnetic signal. The antenna serves to receive a radio frequency (RF) signal at a mobile communication terminal or transmit an internal signal over the air.

Characteristics of the antenna include the radiation pattern, voltage standing wave ratio (VSWR), efficiency, and gain. Particularly, an antenna applied to a mobile communication terminal requires omni-directionality, high efficiency, and low VSWR.

The antennas applied to mobile communication terminals can be classified largely into an internal antenna and an external antennal. Examples of the internal antenna include a ceramic chip antenna and an inverted-F antenna. Examples of the external antenna include a helical antenna and a monopole antenna.

Most mobile communication terminals including mobile phones employ antennas capable of implementing the omni-directional radiant gain pattern because it is impossible to know in which direction radio waves come from.

Recently, mobile communication terminals are applied to not only mobile communications but also short range communications such as radio frequency identification (RFID) systems. In response to this, antennas for short range communications should implement the radiation pattern with the directionality and extend the reading range of RFID tags.

By way of example of solutions for increasing the gain of the antenna with the implementation of the directional radiation pattern, an antenna fixed to and extending along a cover beyond a housing of a portable radiotelephone is disclosed in WO 9809414.

To maximize characteristics of a dipole antenna, the total length of the antenna should be half wavelength. Yet, the length of typical mobile communication terminals does not meet this requirement. To this end, the antenna is constructed to satisfy the half wavelength in length by forming the antenna along the cover and the housing.

In the disclosed literature, since the antenna is disposed along the cover and the housing of the mobile communication terminal, when the cover slides up, the extension of the antenna enables communications. However, to fix the antenna as above, a considerable space is needed in the mobile communication terminal. Accordingly, there is a problem in that the total length of the antenna may enlarge the size of the mobile communication terminal.

To increase the gain of the antenna with the implementation of the directional radiation pattern, another antenna, disclosed in U.S. Pat. No. 5,966,099, includes a reflector disposed on the outside of the internal monopole antenna.

The antenna having the reflector can increase the gain of the antenna by realizing the directional gain pattern, but may occupy a considerable space in the mobile communication terminal to keep an interval between the monopole antenna and the reflector.

SUMMARY OF THE INVENTION

The present invention has been provided to address the above-mentioned and other problems and disadvantages occurring in the conventional arrangement, and an aspect of the present invention is to provide an antenna applied to a slide type mobile communication terminal for implementing directionality of the antenna by connecting boards mounted in two bodies, respectively, and thus expanding the ground plane when the slide type mobile communication terminal slides According to an aspect of the present invention, there is provided an antenna applied to a slide type mobile communication terminal having a first body and a second body that are slidable in a vertical direction, including a first board mounted in the first body; a second board mounted in the second body; a radiating element mounted to the second body; and a first contact formed to connect to the second board at one end and contact with the first board at the other end when the first body slides.

The radiating element may be whip shaped.

The first contact may be strip shaped to connect to the second board at one end and to project away from the second board by a certain interval at the other end.

The first contact may have a length corresponding to a position where the first contact is contactable with a lower end of the first board when the first body slides upward from a lower end of the second board.

The antenna may further include a first extension formed by bending the first contact toward the first board from the other end and extending by a certain width, wherein the first extension contacts with a lower end of the first board when the first body slides upwards.

The antenna may further include a conductive member electrically connecting the second board and the first contact by penetrating through the second board and the first contact at a specific position where the second board and the first contact are connected.

The antenna may further include a couple of second contacts formed at side ends of the first board in a longitudinal direction and facing each other perpendicular to the first board, wherein lower ends of the couple of second contacts contact with the first contact, respectively, when the first body slides upward.

The antenna may further include a second extension formed by bending the second contact inwards from a lower end and extending by a certain width, wherein the second extension contacts with the first contact when the first body slides upward.

BRIEF DESCRIPTION OF THE DRAWINGS

These and/or other aspects and advantages of the present general inventive concept will become apparent and more readily appreciated from the following description of the exemplary embodiments, taken in conjunction with the accompanying drawings of which.

DETAILED DESCRIPTION OF EXEMPLARY EMBODIMENTS

Figure 1:
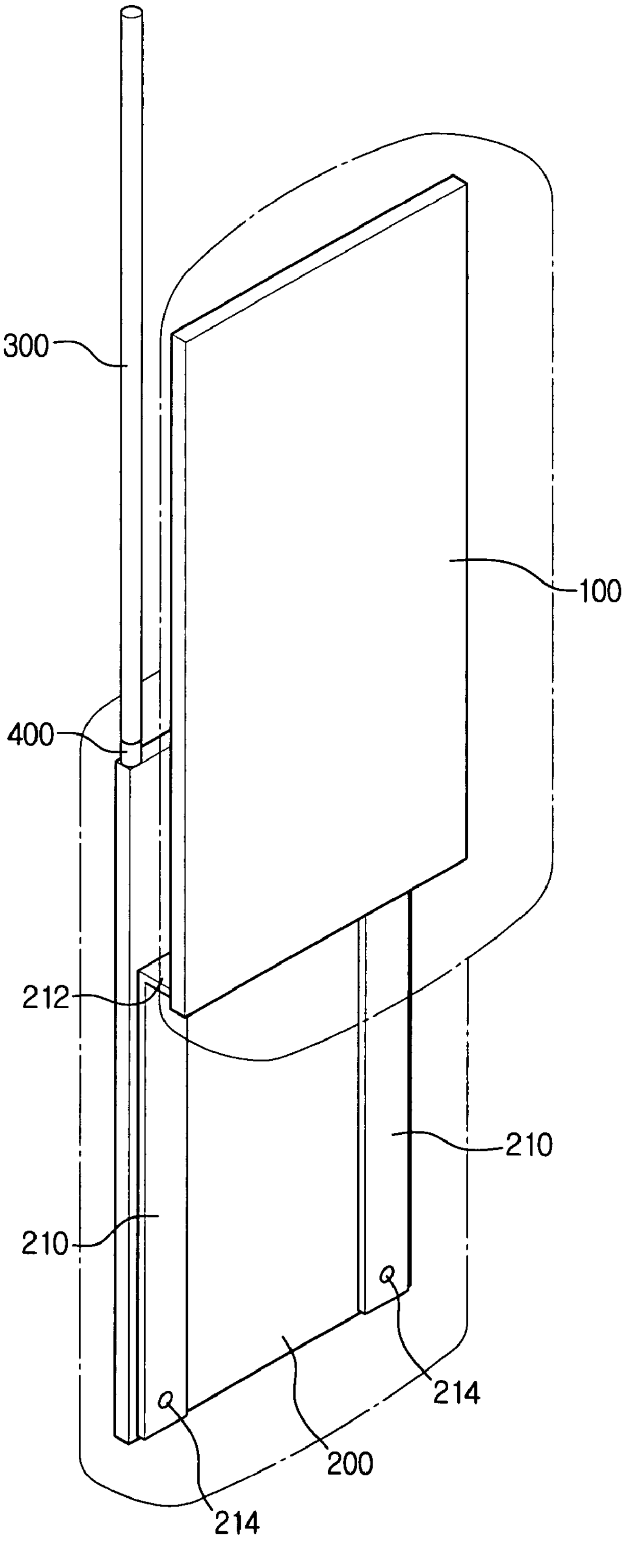
FIG. 1 is a diagram illustrating a structure of an antenna according to one embodiment of the present invention.

Reference will now be made in detail to exemplary embodiments of the present invention, examples of which are illustrated in the accompanying drawings, wherein like reference numerals refer to the like elements throughout. The embodiments are described below to explain the present invention by referring to the figures.

FIG. 1 depicts a structure of an antenna according to one embodiment of the present invention.

Typically, a slide type mobile communication terminal includes a first body (not shown) and a second body (not shown) that are slidable in the vertical direction. The first body is provided with a display such as a liquid crystal display (LCD). The first body is shifted upward when sliding. The second body is provided with a key input part such as number input keys and character input keys. The second body is shifted downward when sliding.

In FIG. 1, to facilitate an understanding, the first body and the second body of the slide type mobile communication terminal are not illustrated. Yet, descriptions are explained as to the antenna applied to the slide type mobile communication terminal in terms of circuit boards that are mounted in the first body and the second body, respectively, and shifted together with the sliding of the first body and the second body.

In the slide type mobile communication terminal, the first board 100 is mounted in the first body which slides upward, and the second board 200 is mounted in the second body which slides downward.

As shown in FIG. 1, a radiating element 300 is fixed to the top side of the second board 200. The radiating element 300 receives current from a power feeding point 400 and radiates electromagnetic waves.

Preferably, but not necessarily, the radiating element 300 is whip shaped. For example, the whip radiating element 300 may be, but is not limited to, a monopole antenna, and is extendable upward by a user's manipulation. For instance, the radiating element 300 may be an internal antenna or an antenna embedded in the slide type mobile communication terminal.

Under the radiating element 300 fixed to the second board 200, the power feeding point 400 is disposed for supplying the current from a signal input terminal (not shown) of the second board 200 to the radiating element 300.

A first contact 210 is formed on the lower side of the second board 200. The first contact 210 contacts with the first board 100 when the first board 100 slides upward. In more detail, the first contact 210 is formed on the second board 200 corresponding to the portion for the key input part which is exposed when the first body is shifted upward.

In still more detail, the first contact 210 may include a pair of strips whose upper ends contact with the first board 100 when the first board 100 slides upward. The first contact 210 may be formed to have a length such that the upper ends of the strips of the first contact 210 are contacted with the lower end of the first board 100 when the first board 100 upward from the lower end of the second board 200.

The upper end of the first contact 210, contacting with the first board 100, may be bent toward the first board 100 and extended by a certain width to contact with the first board 100. The extended width forms a first extension 212. The first extension 212 may be formed on the upper end of the first contact 210 to be contacted with the lower end of the first board 100 when the first board 100 slides upward.

A conductive member 214 penetrates through the second board 200 and the first contact 210 at a certain location where the first contact 210 and the second board 200 are contacted, to electrically connect them. The presence of the conductive member 214 enables the electrical connection through the first board 100, the second board 200, and the first contact 210.

Figure 2:
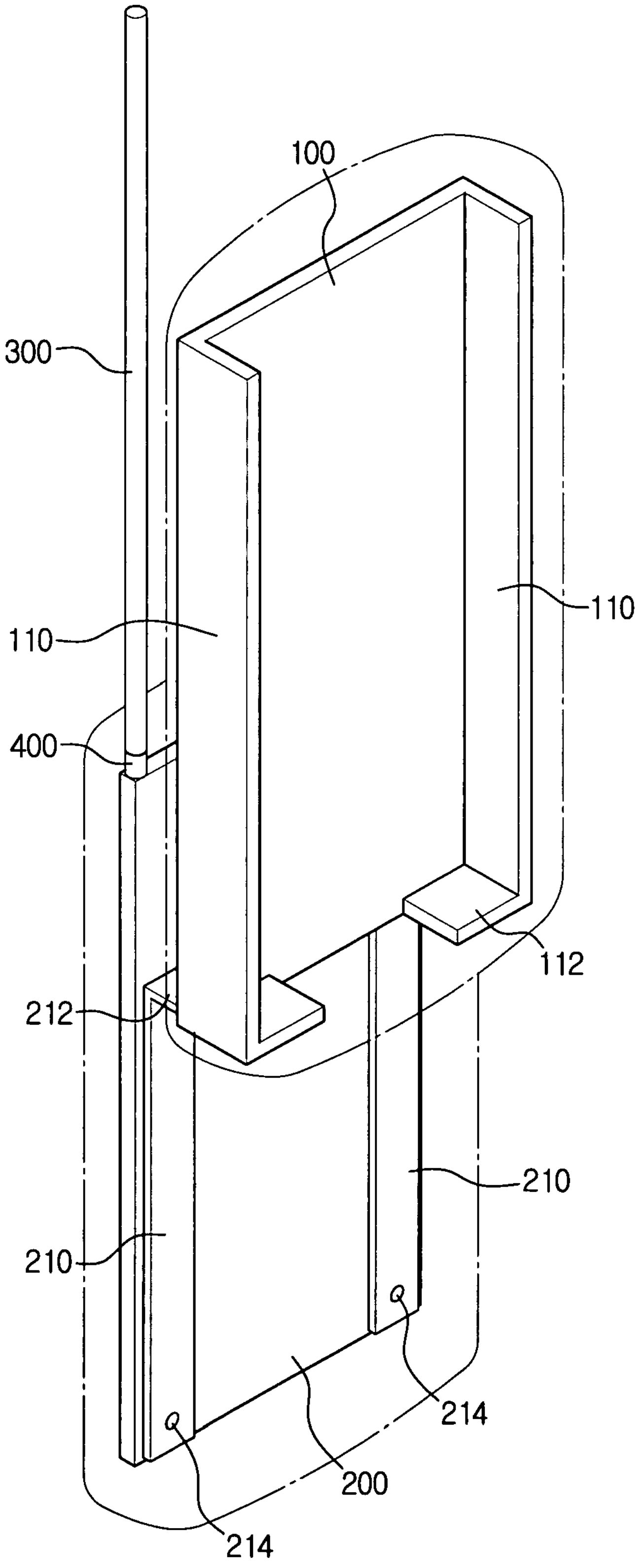
FIG. 2 is a diagram illustrating a structure of an antenna according to another embodiment of the present invention.

FIG. 2 is a diagram illustrating a structure of an antenna according to another exemplary embodiment of the present invention.

In FIG. 2, the structure of the antenna applied to the modified slide type mobile communication terminal is depicted. As was the case in FIG. 1, the first body and the second body are not shown. Instead, the slide type mobile communication terminal is explained using circuit boards which are mounted in the first body and the second body, respectively, and shifted as the first body and the second body slide relative to each other.

In the slide type mobile communication terminal, a first board 100 is mounted in the first body sliding upward, and a second contact 110 is formed on the first board 100.

According to this further exemplary embodiment of the present invention, a couple of second contacts 110 are formed facing each other at both sides of the first board 100 in the longitudinal direction. The second contacts 110 at both sides of the first board 100 face each other perpendicular to the first board 100. When the first board 100 slides up, the second contacts 110 are in contact with the first contact 210 or the first extension 212.

The second contact 110 is bent inward at the lower end of the first board 100 and extended by a certain width. The extended width forms a second extension 112. The second extension 112 is formed to contact with the first contact 210 of the second board 200 when the first body slides up.

A second board 200 is mounted in the second body which slidably moves downward. The second board 200 includes the first contact 210 and a conductive member 214. The first contact 210 has a first extension 212. Since the first contact 210 and the conductive member 214 of the second board 200 function the same and use the like reference number as in FIG. 1, further detailed descriptions will be omitted for the sake of brevity.

Figure 3A:
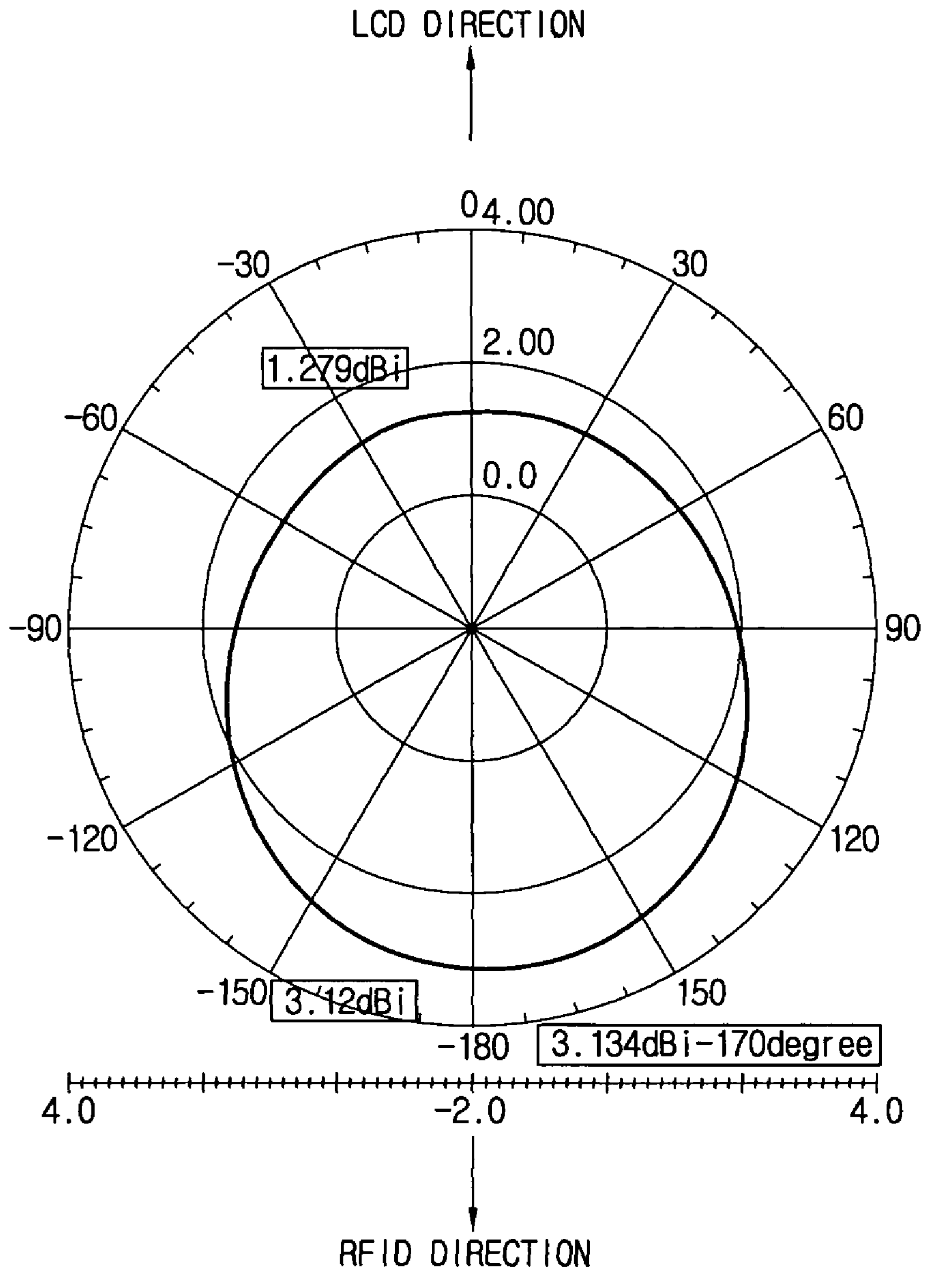
FIGS. 3A and 3B are diagrams showing results of a simulation conducted on the radiating direction of the antenna according to exemplary embodiments of the present invention.
Figure 3B:
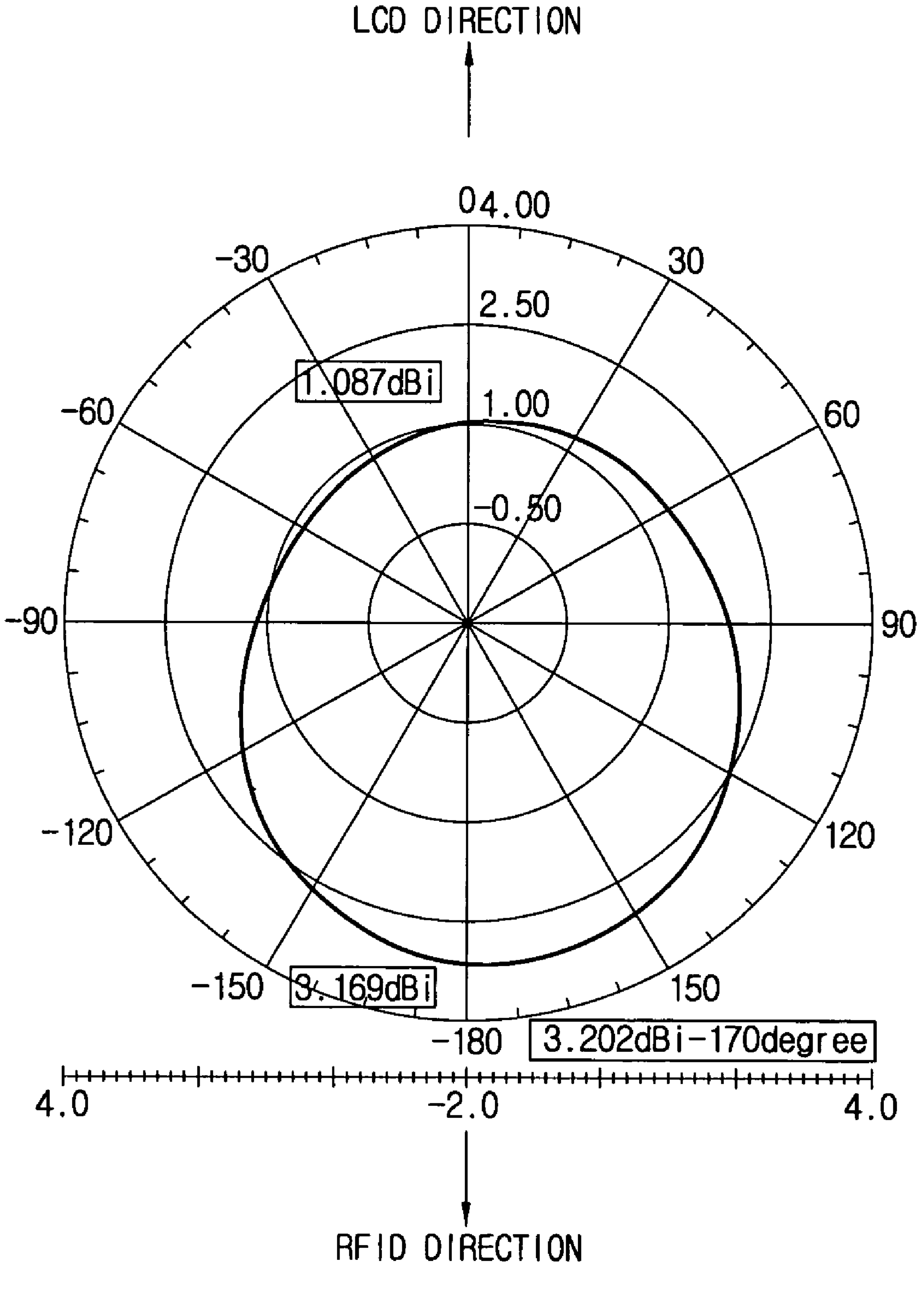

FIGS. 3A and 3B are diagrams showing results of a simulation conducted on the radiating direction of the antenna according to exemplary embodiments of the present invention.

Particularly, FIG. 3A shows the simulation result in relation to the radiating direction of the antenna according to one embodiment of the present invention, and FIG. 3B shows the simulation result in relation to the radiating direction of the antenna according to another embodiment of the present invention.

Herein, for ease of understanding, the upper direction of the simulation result is referred to as an LCD direction, and the lower direction is referred to as an RFID direction. This is because, when reading an RFID tag using the slide type mobile communication terminal, a user turns the lower end of the slide type mobile communication terminal toward the RFID tag while watching the LCD.

In FIG. 3A, the antenna according to one embodiment shows the radiant gain 1.279 dBi in the LCD direction and the radiant gain 3.12 dBi in the RFID direction.

In FIG. 3B, the antenna according to another embodiment shows the radiant gain 1.087 dBi in the LCD direction and the radiant gain 3.169 dBi in the RFID direction.

It is concluded that the antenna has more improved radiant gain in the RFID direction over the LCD direction. It can be seen that the antenna having the first board 100 together with the second contact 110 has an improved radiant gain in the RFID direction over the antenna without the second contact 110.

Figure 4A:
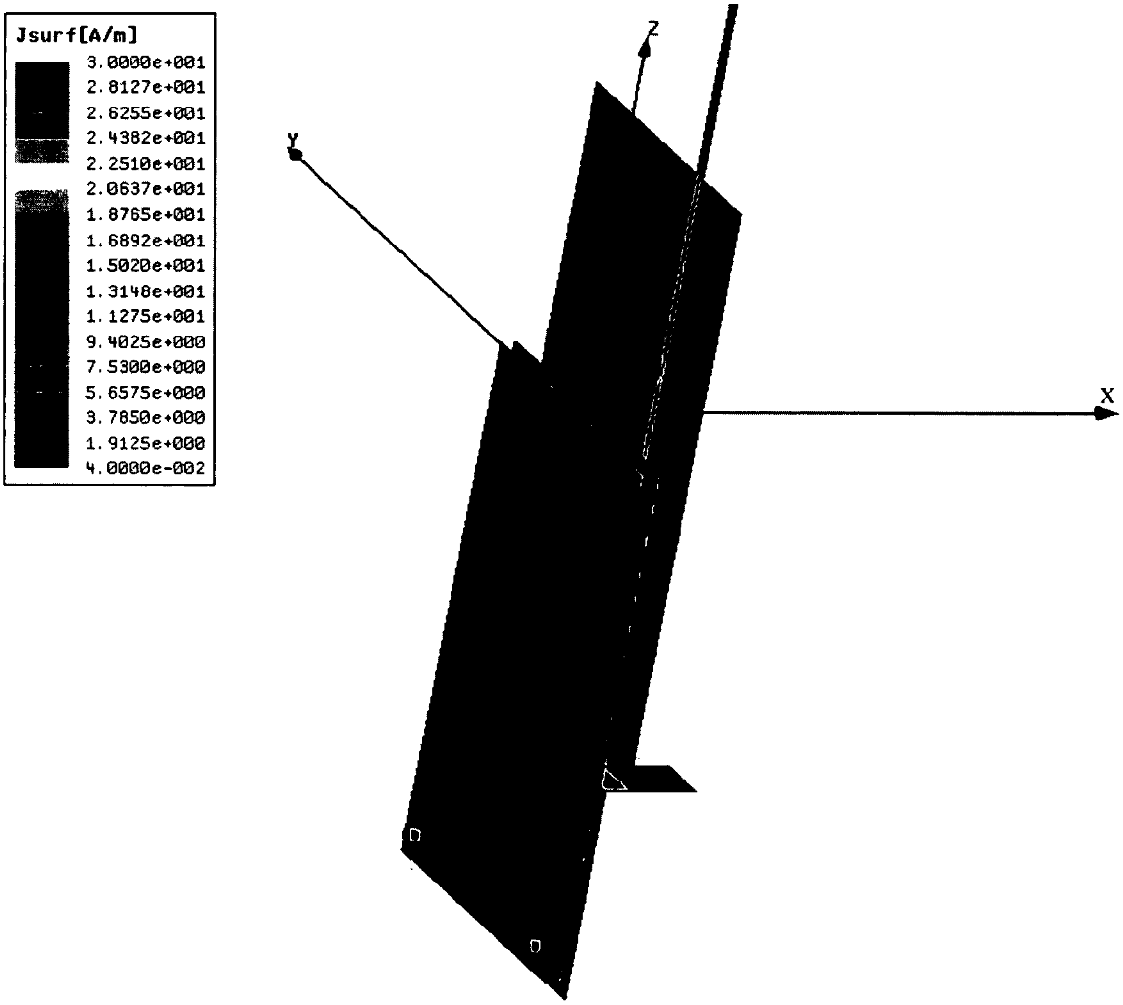
FIGS. 4A and 4B are diagrams showing results of a simulation conducted on the current distribution of the antenna according to exemplary embodiments of the present invention.
Figure 4B:
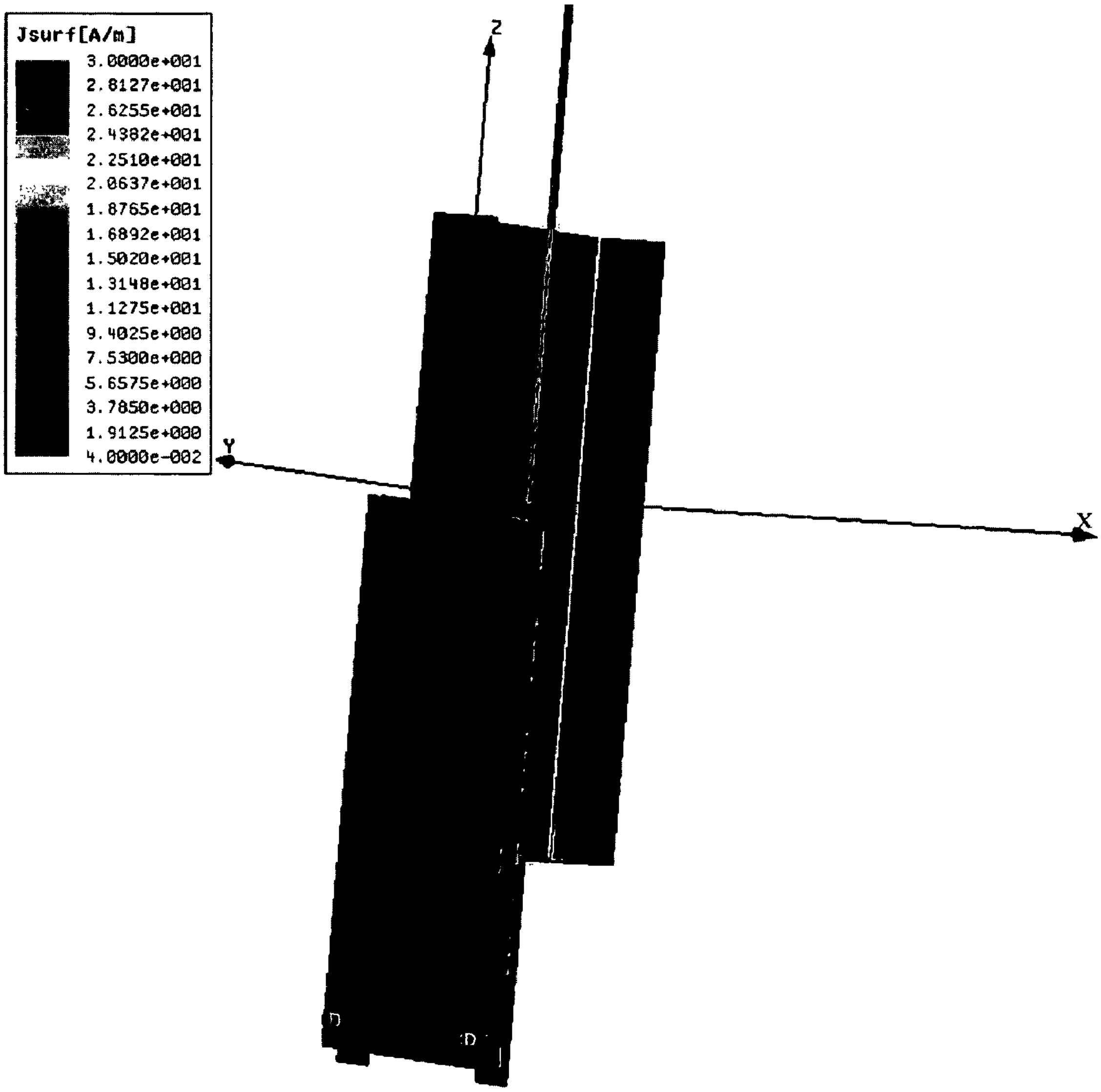

FIGS. 4A and 4B are diagrams showing results of a simulation conducted on the current distribution of the antenna according to exemplary embodiments of the present invention.

Particularly, FIG. 4A shows the current distribution of the antenna of FIG. 1 according to one embodiment of the present invention, and FIG. 4B shows the current distribution of the antenna of FIG. 2 according to another embodiment of the present invention.

As shown in FIGS. 4A and 4B, as one can see from the simulation results in relation with the current distribution of the antenna, the current is uniformly distributed all over the parts including the first board 100 and the second board 200.

Collectively, Table 1 shows the directionality of the antennas of FIG. 1 and FIG. 2. Herein, the related art indicates an antenna of the slide type mobile communication terminal, in which the first board 100 and the second board 200, mounted in the first body and the second body, respectively, are disconnected.

TABLE 1

| Classification | Related art | Antenna in FIG. 1 | Antenna in FIG. 2 |
|---|---|---|---|
| LCD direction | 2.394 dBi | 1.279 dBi | 1.087 dBi |
| RFID direction | 0.916 dBi | 3.12 dBi | 3.169 dBi |

In Table 1, the antenna of FIG. 1 improves the directionality in the RFID direction by 2.204 dBi and the antenna of FIG. 2 improves the directionality in the RFID direction by 2.25 dBi, in comparison with the related art.

In conclusion, there is not any modification made to the existing slide type mobile communication terminal. While the slide type mobile communication terminal using the whip-shaped antenna is retained, the boards each mounted in the two bodies are electrically connected by means of the first contact 210 and the conductive member 214. Therefore, the antenna with the directionality can be implemented.

As set forth above, while the whip-shaped antenna is retained in the slide type mobile communication terminal, the ground plane is extended by connecting the boards in the two bodies when the slide type mobile communication terminal slidably moves. Therefore, it is possible to implement the maximum radiating direction of the antenna with the directionality.

When applied to short range communications with the RFID, the antenna having the directionality can expand the reading range and enhance the performance of the short range communication system.

Although a few exemplary embodiments of the present invention have been shown and described, it would be appreciated by those skilled in the art that changes may be made in these embodiments without departing from the principles and spirit of the invention, the scope of which is defined in the claims and their equivalents.

What is claimed is:

1. An antenna applied to a slide type mobile communication terminal having a first body and a second body that are slidable in a vertical direction, the antenna comprising:

a first board mounted in the first body;

a second board mounted in the second body;

a radiating element mounted to the second body; and a first contact formed to connect to the second board at one end and contact with the first board at the other end when the first body slides, wherein the first contact comprises a pair of strips whose upper ends, which contact the first board, are respectively projected away from the second board by a certain interval.

2. The antenna as in claim 1, wherein the radiating element is whip shaped.

3. The antenna as in claim 1, wherein the first contact has a length corresponding to a position where the first contact is contactable with a lower end of the first board when the first body slides upward from a lower end of the second board.

4. The antenna as in claim 1, further comprising:

a first extension formed by bending the strips of the first contact toward the first board from the upper ends and extending by a certain width, wherein the first extension contacts with a lower end of the first board when the first body slides upwards.

5. The antenna as in claim 1, further comprising:

a conductive member electrically connecting the second board and the first contact by penetrating through the second board and the first contact at a specific position where the second board and the first contact are connected.

6. The antenna as in claim 1, further comprising:

a couple of second contacts formed at side ends of the first board in a longitudinal direction and facing each other perpendicular to the first board, wherein lower ends of the couple of second contacts contact with the first contact, respectively, when the first body slides upward.

7. The antenna as in claim 6, further comprising:

a second extension formed by bending the second contact inwards from a lower end and extending by a certain width, wherein the second extension contacts with the first contact when the first body slides upward.

8. The antenna as in claim 1, wherein the first contact is formed on a lower side of the second board.

9. The antenna as in claim 1, further comprising a power feeding point disposed for supplying current from a signal input terminal of the second board to the radiating element.

10. The antenna as in claim 1, wherein the first board is a first circuit board and the second board is a second circuit board.

* * * * *